Oct. 24, 1967  B. P. DAWES  3,348,736
LIQUID DISPENSER WITH DISPENSING CYCLE REGISTER
Filed Sept. 24, 1965  3 Sheets-Sheet 1
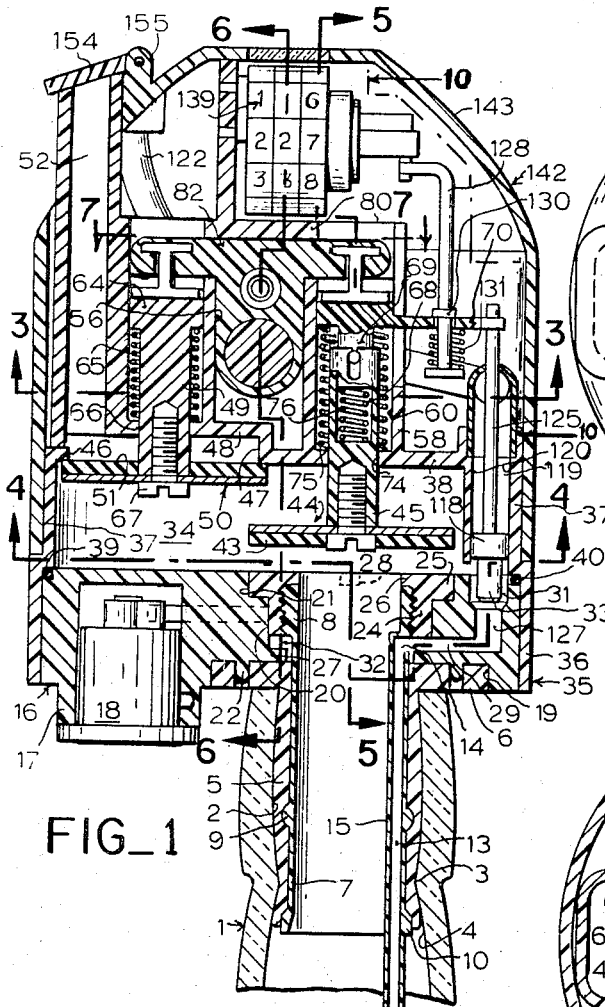
FIG_1
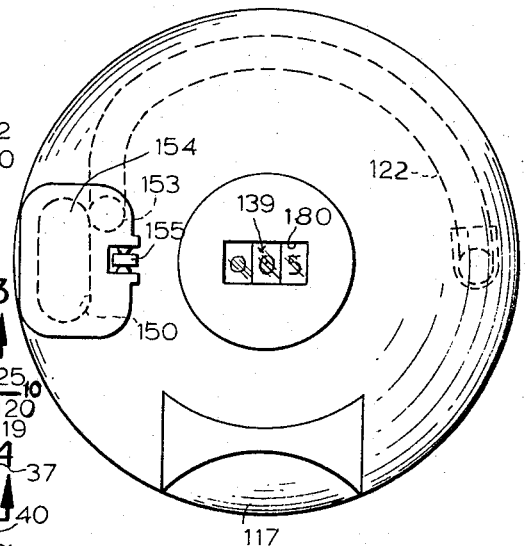
FIG_2
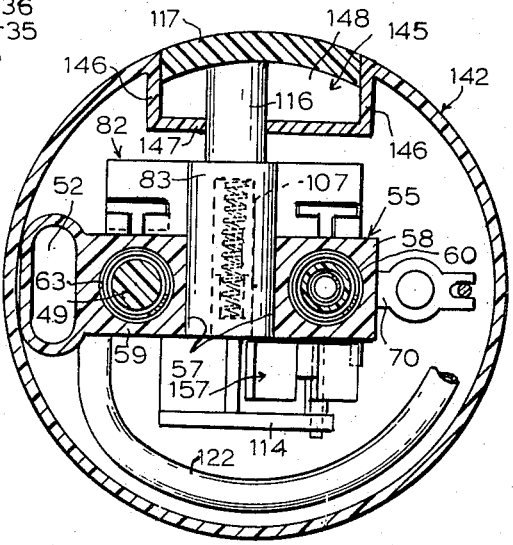
FIG_3
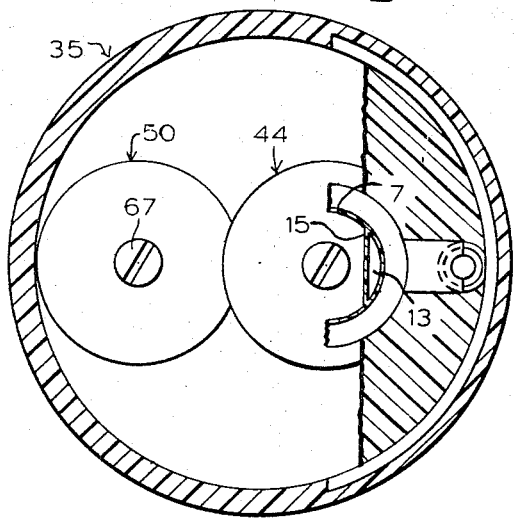
FIG_4
INVENTOR.
BAILEY P. DAWES
BY
Boyken, Mohler & Foster
ATTORNEYS Oct. 24, 1967     B. P. DAWES     3,348,736
LIQUID DISPENSER WITH DISPENSING CYCLE REGISTER
Filed Sept. 24, 1965     3 Sheets-Sheet 2
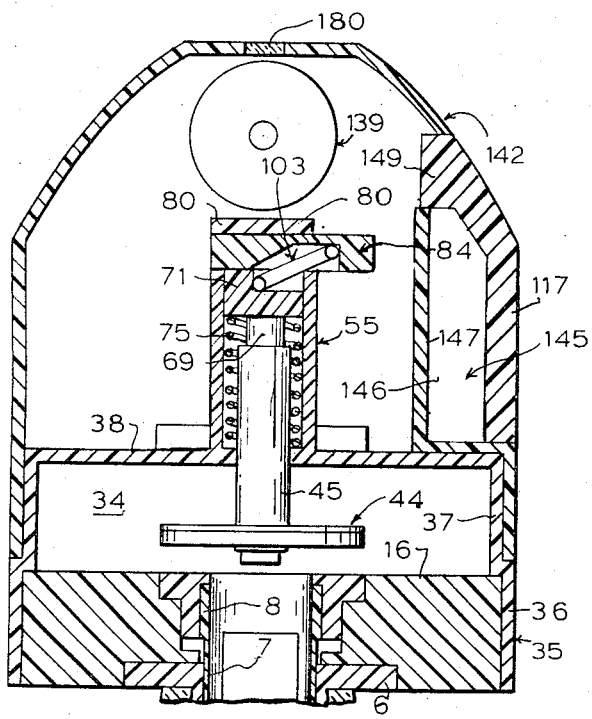
FIG_5
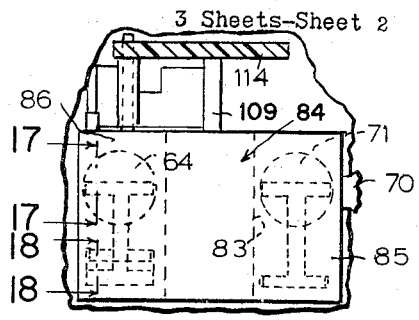
FIG_7
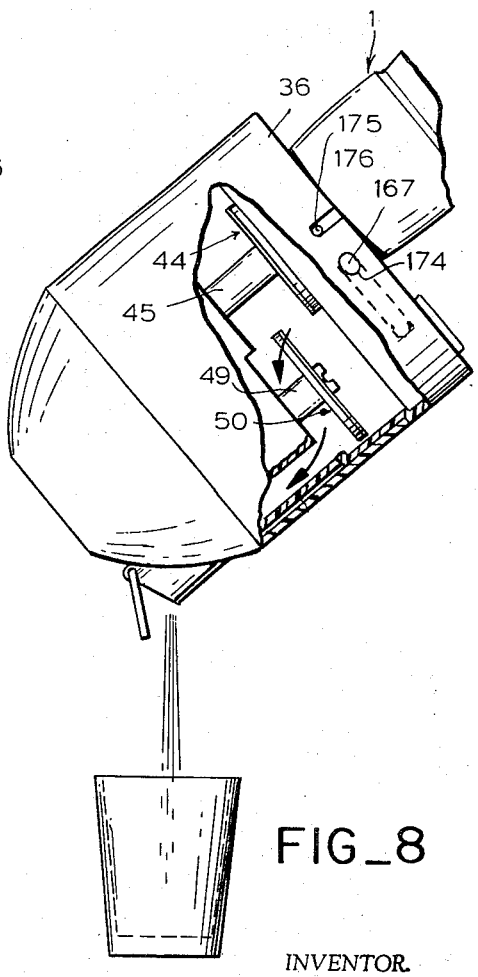
FIG_8
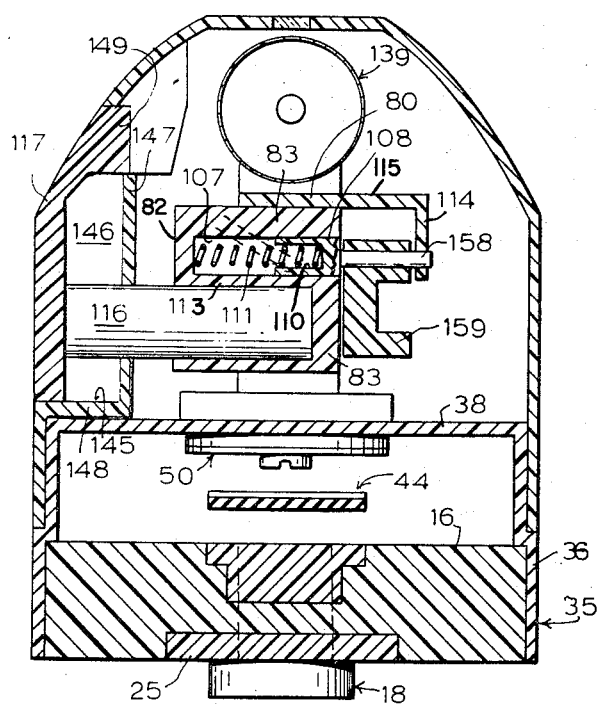
FIG_6
INVENTOR.
BAILEY P. DAWES
BY
Boykin, Moheler & Foster
ATTORNEYS Oct. 24, 1967  B. P. DAWES  3,348,736
LIQUID DISPENSER WITH DISPENSING CYCLE REGISTER
Filed Sept. 24, 1965  3 Sheets-Sheet 3
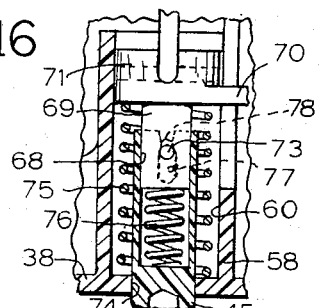
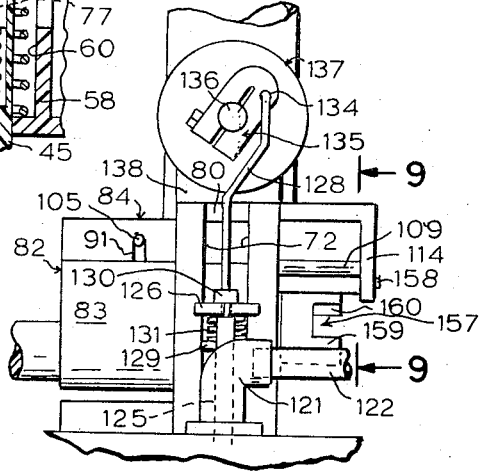
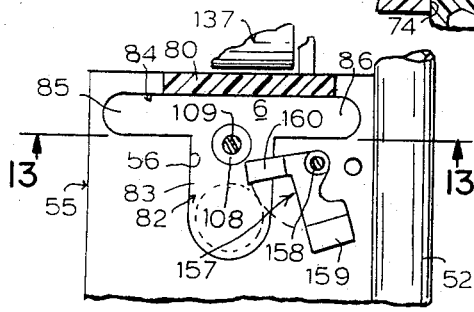
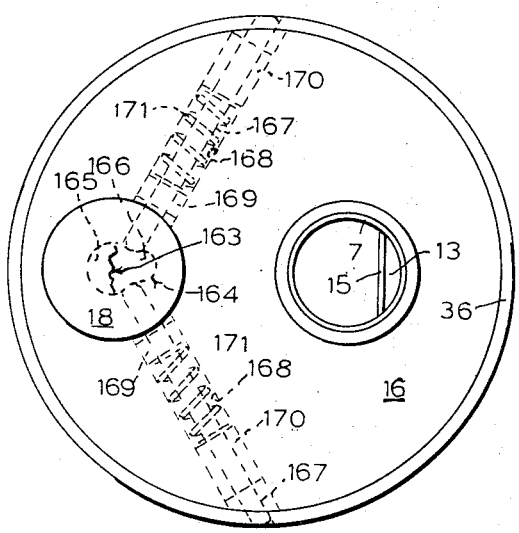
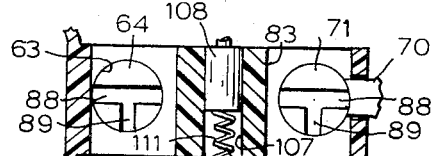
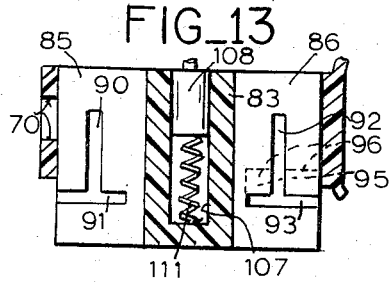
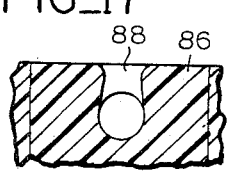
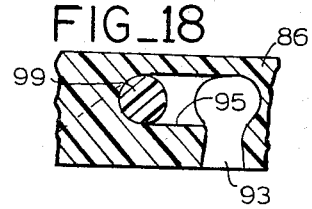
INVENTOR.
BAILEY P. DAWES
BY
Boykin, Mohler & Foster
ATTORNEYS United States Patent Office 3,348,736
Patented Oct. 24, 1967

3,348,736
LIQUID DISPENSER WITH DISPENSING
CYCLE REGISTER
Bailey P. Dawes, Los Altos, Calif., assignor, by mesne assignments, to P. B. Florence Co., Inc., doing business as Pan Pacific Company, San Francisco, Calif., a corporation of California
Filed Sept. 24, 1965, Ser. No. 489,876
3 Claims. (Cl. 222—38)

ABSTRACT OF THE DISCLOSURE

A liquid dispenser adapted to be attached to the outlet portion of a container, having a through conduit that includes a measuring chamber having valves therein, and through which the liquid contents of the container is adapted to be dispensed in measured amounts by manually actuable means connected on said dispenser connected with said valves.

---

One of the objects of the invention is the provision of a liquid dispenser adapted to be locked onto the neck of a bottle, or the like, and which dispenser, upon manual actuation of valve means thereon when the bottle is in pouring position, will automatically dispense and accurately measured quantity of the contents of the bottle and will also actuate a counter with each such actuation to thereby maintain a record of the number of such amounts that have been dispensed.

Frequently in restaurants and cocktail bars customers are provided with a bottle, or bottles, from which they may prepare their own mixtures, or dispense their own servings, and the present invention provides a ready and accurate record of the number of servings dispensed to enable a quick and accurate settlement.

Another object of the invention is the provision of a liquid dispenser that is constructed to not only measure and to dispense accurate predetermined quantities or servings of liquid from a container, but that is adapted to withstand severe and long usage, and that is economical to make and easy to operate.

A still further object of the invention is the provision of a dispenser for measured amounts of liquid from a container, and which dispenser is attractive in appearance, relatively inconspicuous and that includes a counter that records the number of measured amounts that are dispensed, and that is also adapted to be securely locked against unauthorized tampering therewith for obtaining inaccurate servings or unrecorded dispensing operations.

An added object is the provision of a dispenser for automatically measuring, dispensing and counting servings of liquid dispensed from a bottle or the like containing said liquid, and which dispenser is light in weight, and that is provided with a locking arrangement preventing access to within the dispenser for altering the operation of the dispenser and counter, and the key to which cannot be removed except when in a position in which the dispenser is locked to the bottle neck or the like.

Other objects and advantages will appear in the description and drawings.

In the drawings, FIG. 1 is a vertical cross sectional view through the dispenser, the latter being shown in position on the neck of a conventional bottle.

FIG. 2 is a top plan view of the dispenser.

FIG. 3 is a cross sectional view taken substantially along 3—3 of FIG. 1.

FIG. 4 is a cross sectional view substantially at line 4—4 of FIG. 1 with structure removed for purposes of clarity.

FIG. 5 is a cross sectional view taken substantially along line 5—5 of FIG. 1.

FIG. 6 is a cross sectional view along substantially line 6—6 of FIG. 1.

FIG. 7 is a fragmentary sectional view taken generally along line 7—7 of FIG. 1, the broken lines identifying structure below rectangular full-line central portion shown.

FIG. 8 is a part elevational, part sectional view showing the dispenser in pouring position, the view being reduced in size compared with FIGS. 1–6.

FIG. 9 is a fragmentary view of part of the dispenser as seen substantially from line 9—9 of FIG. 10.

FIG. 10 is a fragmentary elevational view of a portion of the dispenser as seen from line 10—10 of FIG. 1.

FIG. 11 is a bottom plan view of the dispenser.

FIG. 12 is a fragmentary, horizontal cross sectional view of a central portion of the structure shown in FIG. 3 at the level of a line parallel with and slightly below line 7—7 of FIG. 1 with the links of FIGS. 1, 14 and 15 omitted.

FIG. 13 is a fragmentary horizontal cross sectional view taken at the same level as FIG. 12 looking upwardly as indicated by line 13—13 of FIG. 9, but reversed right to left with respect to FIG. 12 and with the links of FIGS. 14, 15 omitted..

FIG. 14 is a detached plan view of a link, the upper end of which as seen in FIG. 14 is to be received in the T-shaped recess seen in the left end of FIG. 12, and the lower end of which is to be received in the T-shaped recess in the right end of FIG. 13.

FIG. 15 is a detached top plan view of a link, the upper end of which, as seen in FIG. 15, is to be received in the T-shaped recess shown in the right end of FIG. 12, and the lower end of which is to be received in the T-shaped recess shown in the left end of FIG. 13.

FIG. 16 is an enlarged vertical cross sectional view of a valve stem structure shown in about the central position of FIG. 1.

FIG. 17 is a greatly enlarged fragmentary cross sectional view taken along line 17—17 of FIG. 7.

FIG. 18 is a greatly enlarged, fragmentary cross sectional view taken along line 18—18 of FIG. 7.

Referring to FIG. 1, the neck of a conventional bottle on which the dispenser is secured is generally designated 1 and the walls of portion 2 of the discharge passageway leading to the open outer end of the neck is circular in transverse cross sectional contour, but has a slightly concave contour longitudinally thereof or is bellied out slightly. At the lower end of portion 2, as at 3, the diameter of the walls of the passageway is slightly restricted and below the point 3, the passageway or bore through the neck is again progressively enlarged, as at 4. Thus there are two successive enlargements in the pouring passageway in the neck, the first adjoining the open outer end of the neck, or mouth, and the second below and adjoining the restriction 3 that separates the two enlargements. This is common structure in bottles.

The dispenser itself comprises an expansible sleeve 5 of elastic, rubber-like material, normally having straight outer sides adapted to be inserted into the neck of the bottle so that the lower end portion will extend to a point spaced below the restriction 3, which sleeve includes a radially outwardly projecting flange 6 at its upper end that, in turn, is adapted to extend into engagement with the upper axially outwardly facing surface of the neck. This flange functions as a gasket when the dispenser is secured on the bottle.

An open ended tube 7 of rigid material is fitted within the sleeve 5 and projects above the latter, terminating at its upper end in a radially outwardly thickened portion 8 that is exteriorly threaded.

The part of the tube 7 that is within the portion of sleeve 5 between the restriction 3 of neck 1 and the outer open end of the latter is formed with a radially outwardly projecting rib 9 of generally semicircular cross sectional contour, and the inner surface of sleeve 5 has a complementarily formed recess into which rib 9 is seated. The lower end of tube 7 terminates in a radially outwardly projecting rib or flange 10. When the sleeve 5, with tube 7 therein, is positioned within neck 1, and the tube is drawn upwardly while the sleeve is held in the neck, the relatively elastic material of sleeve 5 will be forced into the enlargements in neck 1 by the ribs 9, 10, locking the tube and sleeve 5 against withdrawal from the neck.

Tube 7 is formed along one side with a passageway 13, the walls of which extend downwardly below the lower end of tube 7. This tube provides an air inlet to admit air into the bottle below the level of the liquid therein during the operation of filling the measuring chamber, as will later be described in detail. The upper end of passageway 13 is formed with an opening 14 in a lateral side thereof just below the thickened upper threaded portion 8 of said tube. As seen in FIGS. 1, 4, 11 the inner sidewall of passageway 13 is disposed within the bore of tube 7 while the outer sidewall of the passageway is part of the cylindrical wall of tube 7 (FIGS. 1, 11).

The lower body of the dispenser is generally designated 16. The words "lower," "upper" and words of similar connotation refer to the dispenser when in normal inoperative upright position on an upright bottle. The words "inner," "inwardly" and words of similar connotation are used with reference to the central vertical axis of the main body of the dispenser, which is at the innermost point, except where used with respect to the elements of the portion that extends into the neck, in which case they are used with reference to the central vertical axis of the last mentioned portion.

The sleeve 5 and tube 7 are eccentrically positioned relative to the lower body 16, the latter being cylindrical and formed with an eccentrically positioned passageway into which the upper end of tube 7 projects.

Projecting downwardly from body 16 at the side of the central axis of said body opposite to tube 7 is a boss 17 and the body 16 is recessed concentrically of said boss to receive a key actuatable lock 18.

The lower portion of the passageway in body 16 into which the tube 7 projects is enlarged at 19 to receive the flange 6, and the upper end portion of said passageway is successively enlarged as at 20 and 21. A pair of projections 22 formed on the base of recess 19 extend into openings formed in flange 6 to prevent rotation of flange 6 and sleeve 5 relative to the lower body 16.

An annular, centrally-open sleeve-expanding nut 24 fits in the enlarged portion 21 at the upper end of the passageway into which tube 7 extends. This nut includes a circular head 25 at its upper end that is in recess 21 of body 16, and is internally threaded with its threads in engagement with the exterior threads on the upper thickened part 8 of tube 7. A radially inwardly projecting flange 26 at the upper end of the bore in nut 24 extends over the upper end of tube 7. Recesses 28 formed at opposite sides of the head 25 of nut 24 are formed at opposite sides of the head 25 of nut 24 are adapted to receive the fingers of a conventional spanner wrench for tightening and loosening the nut. Upon tightening said nut the tube 7 will be drawn upwardly within sleeve 5 to expand the latter for locking the lower body 16 to the neck of a bottle and access to the nut 24 can only be had from above body 16.

A duct 29 is formed in lower body 16, which duct communicates at one end with an annular space 32 at the lower end of enlargement 20 in the passageway into which tube 7 projects, which space is below nut 24. The other end of duct 29 opens upwardly into an enlarged upwardly opening recess 31 formed in the upper side of body 16. A valve member 33 spaced within the enlarged upper end of said duct is adapted to move downwardly into the upper portion of said duct at said enlargement. Said recess 31 opens into a measuring chamber 34 that is within a cylindrical upper body, the latter being generally designated 35. The lower side of said chamber is the upper surface of the lower body 16.

Upper body 35 comprises a cylinder having cylindrical skirt 36 into which the lower body 16 extends. A cylindrical upward extension 37 of skirt 36 has a horizontal partition 38 formed therein and spaced above body 16 to form the upper wall of the measuring chamber 34. The said cylindrical extension 37 is of slightly smaller internal and external diameter than skirt 36 thereby providing an axially downwardly facing surface or shoulder 39 at their junctures extending over the upper outer marginal portion of body 16, which marginal portion is rabbeted to receive a sealing O-ring 40 for sealing the upper and lower bodies 35, 16 against leakage past the O-ring.

The upper surface of the head of nut 24 provides a seat for the relatively soft circular seal 43 on a circular, horizontally disposed valve member generally designated 44. Valve member 44 is carried on the lower end of a vertically extending stem 45, which stem slidably extends through an opening in partition 38. As will later be explained, valve member 44 is adapted to be vertically reciprocated between positions in which the central opening in nut 24 and the passageway in tube 7 are opened and closed to flow of liquid from within the container or bottle into the measuring chamber 34.

Partition 38 is also formed with a circular opening 46 that is offset to the side of the body 16 opposite to the position of valve 44 and to the opening in nut 24.

Integral with partition 38 is an upwardly projecting annular flange 47. An upper horizontally disposed wall 48 extends inwardly from flange 47 to provide an upper wall spaced above opening 46.

Wall 48 is formed with an opening coaxial with opening 46, through which opening a vertically disposed valve stem 49 reciprocably extends. Stem 49 has a circular valve member 50 seecured on its lower end, which valve member was a circular, horizontally disposed seal 51 on its upper side. Upon upward movement of the stem 49 and member 50 the seal 51 will close opening 46 and upon downward movement the opening 46 will be opened.

A vertically extending passageway 52 extends upwardly from the space above valve member 50, which passageway has generally oval or elliptical walls in horizontal cross sectional contour, and which walls project at the upper end of the passageway through an opening in an outer shell or cover (later to be described) that covers the elements on and above partition 38. The lower end of said passageway 52 opens into the space above the valve member 50 and the said walls of the passageway are integral with wall 48, which wall, in turn, is integral with partition 38. The inner wall of passageway 52 is part of a block, generally designated 55, that is integral with and that projects upwardly from partition 38.

Block 55 (FIGS. 3, 5, 9) is substantially oblong in horizontal cross sectional contour and is formed with a central transversely extending generally T-shaped opening (FIG. 9) the leg of which has flat vertically extending opposed side surfaces 57 defining the adjacent sides of a pair of upstanding portions 58, 59 (FIG. 3) of the block, and over which the laterally oppositely outwardly extending portions of said T-shaped opening extend.

Portion 58 of block 55 is formed with a cylindrical, vertically extending passageway 60 (FIGS. 1, 3) that is coaxial with, and that receives the upper portion of stem 45 (FIGS. 1, 16) while portion 59 is formed with a cylindrical, vertically extending passageway 63 (FIG. 3) that is coaxial with, and receives stem 49 on valve element 50.

Stem 49 may be solid and formed with an upper end portion 64 that slidably fits the bore or passageway 63 in portion 59 (FIG. 1). The length of stem 49 below its upper end portion 64 is of reduced diameter, and slidably extends through an opening in the partition portion 48 of the block 55 that, in turn, is above valve member 50. An expansion coil spring 65 (FIG. 1) around the lower, reduced diameter portion of the stem 49 reacts between the enlarged upper end portion 64 and the part 66 of the block 55, or portion 48 of partition 38, through which the stem extends.

The lower end of stem 49 is tapped for a machine screw 67 (FIGS. 1, 4) that removably secures the valve member 50 to said stem.

The spring 65 functions to yieldably move valve member 50 upwardly so that seal 51 will close opening 46, and consequently the flow of liquid from measuring chamber 34 into passageway 52.

Referring to stem 45 of valve member 44 (FIGS. 1, 16) the upper end portion of said stem is formed with a cylindrical recess 68 concentric therewith, and which recess is open at its upper end to slidably receive therein the downwardly projecting member 69 on one end of a horizontally laterally extending guide arm 70. The upper end portion 71 of member 69 has arm 70 integral therewith and is enlarged to slidably fit within bore 60. Arm 70 extends through a slot 72 (FIG. 10) formed in one side of the upstanding portion 58 of block 55 for vertical reciprocable movement with member 69.

The stem 45 is less in diameter than that of the bore or passageway 60, and it slidably extends through and fits opening 74, thus there is provided an upwardly facing shoulder corresponding to portion 66 (FIG. 1) at the lower end of passageway 63. A coil spring 75 around stem 45 reacts between the said shoulder at the lower end of bore 60 and an enlarged head 71 that, in turn, is on member 69, thereby yieldably urging member 69 and its head 71 upwardly to space head 71 above the upper end of stem 45. A second coil spring 76 is within recess 68 and reacts between member 69 and the bottom of recess 68 to yieldably urge member 69 upwardly. Spring 76 is preferably weaker than spring 75.

Member 69 is formed with a pair of oppositely outwardly extending projections 73 (FIG. 16), which projections extend into vertically elongated slots 77 (FIG. 16) that are formed in opposite sides of recess 68. The upper ends of slots 77 open upwardly through restricted passageways 78, and projections 73 are sprung through said passageways into slots 77 in which the projections are fully reciprocable vertically. Thus the projections 73 connect the member 69 and stem 49 against separation, but relative vertical movement between stem 49 and member 69 is permitted.

Upon downward movement of member 69 the valve member 44 will be moved downward until the latter seals over the opening in nut 24, thus sealing off passage of liquid from the bottle or receptacle into chamber 34, but further movement of member 69 is permitted by spring 76. Upon upward movement of portion 69, the element 69 may move upwardly without releasing the valve 44 until the projections 73 reach the upper end of slots 77.

The upper portion of block 55 is formed with a horizontal bridge piece 80 (FIG. 9) that is spaced above the upstanding portions 58, 59 and above the upper open ends of pasageways 60, 63. The under surface of this bridge piece and the upper surfaces of portions 58, 59 coact to form the upper and lower surfaces of the arms of the T-shaped recess in block 55. In the drawings the portions of the bridge piece over each of the bores 60, 63 are formed with openings concentric with said bores.

Horizontally slidable between the flat sides 57 of portions 58, 59, and in the space between the bridge piece 80 and the upper ends of said portions 58, 59 is a T-shaped slide generally designated 82 (FIG. 1, 9). As seen in FIG. 3, the leg 83 of the T-slide is relatively thick and centrally depends from the head of the slide.

In FIG. 7, the head of the slide is generally designated 84 and is seen in top plan view, with the portion 85 of said head projecting to one side of leg 83 extending over the upper end of upstanding portion 58 and the other portion 86 of the head extending over the upstanding portion 59 of block 55. Thus portion 85 extends over the upper end of bore 60 and over the enlarged head 71 on element 69 that is above stem 45, while portion 86 extends over the upper end of bore 63 and over head 64 of stem 49.

The upper surfaces of head 64 of stem 49, and head 71 of portion 69 that is coaxial with stem 45, are each formed with a generally T-shaped upwardly opening recess to face the under surfaces of head portions 85, 86 of the T-shaped slide, and said portions 85, 86, in turn, project oppositely outwardly relative to leg 83 of said slide. Each of said T-shaped recesses (FIG. 12) comprises a straight recess 88 that defines the cross head of the T, and a straight recess 89 that defines the leg of each recess, the recess 89 opening at one end thereof into each recess 88 intermediate the ends of the latter, and each recess 89 is at a right angle to the recess 88.

FIG. 13 shows a bottom plan view of the head portions 85, 86 inverted right to left thus the right hand portion 86 in said figure will overlie and face generally toward portion 64 of FIG. 12, and the left hand portion 85 shown in FIG. 13 will overlie and generally face the upper surface of the right hand member 71 shown in FIG. 12.

The under face of portion 85, which is shown at the left hand side of FIG. 13 is formed with a generally T-shaped recess having a leg portion 90 that is parallel with the leg portion 89 of a T-shaped recess formed in the upwardly facing surface of the member 71 that is above stem 45. This is when the portion 85 overlies member 71 in the assembly and its head portion is designated 91.

The under face of portion 86 seen at the right side of FIG. 13 is formed with a T-shaped recess having a leg portion 92 that will face downwardly over the upper end portion 64 of stem 49 in the assembly of FIG. 1, and recess 93 forms the head of the T-shaped recess in portion 86.

The material defining the opposite sides of recess 93 is recessed at 95 (FIGS. 13, 18) to the dotted lines 96 (FIG. 13).

A relatively short I-shaped link generally designated 97 (FIG. 14) has a cross head 98 at one end that is adapted to be received in recess 88 in the upper end of stem 49 while the cross head 99 at the opposite end of the connecting arm 100 is adapted to be received in the recess 93 in the head portion 86 of the T-slide 82. The connecting arm 100 that connects the cross heads is adapted to lie in aligned recesses 89, 92 that are respectively in the portion 64 (FIG. 12) and 86 (FIG. 13) in the assembly of FIG. 1.

A second and longer I-shaped link, generally designated 103 (FIG. 15) has a cross head 104 at one end and a cross head 105 at the opposite end, with arm 106 connecting said cross heads. The cross head 104 is adapted to be received in the transverse recess 88 in the upper surface of stem member 71 of stem 45 and cross head 105 is adapted to be received in the recess 91 in head portion 85 of the T-slide 82 while the connecting arm 106 will be received in the aligned recesses 89, 90 that are respectively formed in portions 71, 85.

Since the link 103 is longer than the link 97, in connecting the links with the head portions 85, 86 of the T-slide and with the upper ends 71, 64 of the valve stem portions, it is necessary to first install the link 97 and when link 103 is next installed, the head 99 of link 97 will slide into the recesses 95 in head portion 85.

As seen in FIG. 5, the link 103 will extend slantingly upwardly from the upper end of valve portion 71, and the same will be true of link 97 and its relation to portions 64, 86.

The width of the T-slide 82 in the horizontal direction of the passageway between upstanding portions 58, 59 of the block 55 is substantially greater than the length of said passageway, so that one end of said T-slide will be flush with one of the corresponding lateral coplanar sides of said upstanding portions, while the opposite end of said slide will project a substantial distance laterally outwardly of the opposite vertical sides of said upstanding portions (FIGS. 3, 5, 6). This is the position of slide 82 when the bottle is upright or when inverted to fill the measuring chamber 34, and when it is in this position, it is seen that there is an upward thrust of valve stems 45, 49 due to springs 75, 65 respectively reacting against said stems for yieldably holding valve member 44 open and for yieldably holding valve member 50 closed. These springs will also tend to yieldably hold the slide 82 in the position shown in FIGS. 3, 5 and 6, and in addition, spring 75 will hold valve members 33, 118 (FIG. 1) elevated.

The T-shaped slide 82 is formed with a horizontally extending laterally outwardly opening recess 107 (FIGS. 3, 6) that extends almost the full width of the T-slide and which is positioned midway between the horizontal length thereof and nearly at the level of the head 84 of said slide 82. This recess 107 opens outwardly of the lateral side of the leg 83 of slide 82 that is normally flush with the coplanar lateral side surfaces of upstanding members 58, 59 (FIG. 3) and a horizontal plunger rod 108 (FIG. 6) is horizontally reciprocable in said recess. Rod 108 includes coaxial stem 109 (FIG. 9) integral therewith that projects outwardly of said slide 82. The portion of the plunger rod 108 that is within the recess 107 is formed with a recess 110 that opens outwardly of the rod at the end opposite to stem 109, and a coil spring 111 (FIG. 6), supported within said recess, reacts between the closed end of the latter and the closed end of recess 108 to yieldably hold the outer end of stem 109 (FIGS. 7, 9) against a vertical wall 114 (FIGS. 3, 6, 7) that is integral with and that depends from a lateral extension 115 of the bridge piece 80 that, in turn (FIG. 6), extends over the upper portion of the T-slide 82. This plunger rod and spring function to return and to yieldably hold the T-slide 82 in the position shown in FIGS. 3, 5, 7.

The leg 83 of the T-slide 82 is also formed with a recess 113 that is below and parallel with recess 107 (FIG. 6) and which recess opens outwardly of leg 83 at the side of the latter opposite to the side from which the plunger stem 109 projects. Secured within said recess 113 is one end of a horizontal push rod 116. This push rod projects outwardly of the T-slide 82 and the projecting end has a finger engageable head 117 integral therewith, the outer surface of which head conforms to and is flush with the outer surface of the cover that encloses the working parts of the device that are on and above the partition 38, as will later be described.

Referring to FIG. 1, and to the recess 31 that is in the lower body 16 of the dispenser. As explained previously, valve member 33 is received in this recess 31 and the latter is of greater diameter than said valve member so that air may pass the valve member into the bottle through duct 29 immediately upon the lower end of the valve member being lifted from its slidable engagement with the restricted diameter of the sides of duct 29 that extend downwardly from the enlarged recess 31.

The upper portion of the valve member 33 has a cylindrical sided enlargement 118 rigid therewith that is vertically reciprocable within a vertical guide passageway 119 the walls 120 of which are integral with partition 38, and with the wall 37 of the upper body portion with which partition 38 is integral. The walls of said passageway continue upwardly above partition 38, and secured within said upward continuation is an elbow fitting 121 (FIG. 10) having an open-ended passageway therethrough. One open end of said passageway opens into passageway 119 and the opposite end opens into a flexible air tube 122 (FIG. 2) that extends to the upper end of the device where it is open to the air when the bottle is tilted for pouring, as will later appear.

A vertical stem 125 (FIG. 1) extends upwardly from the valve member 33 spaced within passageway 119 and it extends slidably through an opening in the upper side of elbow 121 and above the latter. The upper end of said stem 125 is formed with an annular groove into which the adjacent sides of a fork 126 extend (FIG. 10). This fork is formed in the outer end of guide arm 70, which guide arm, in turn, connects with and is movable with the valve stem 45 with which valve member 44 is connected. Upon downward movement of said stem 45 the valve member 33 will slidably enter the portion 127 of duct 29 and the enlargement 118 on the valve stem 125 will move into recess 31 to admit air into the measuring chamber 34 so the liquid therein will freely flow out of the measuring chamber through the passageway 52 into the desired glass (FIG. 8).

The guide arm 70 that is connected with the valve stem 45 for movement therewith is formed with an opening through which a vertically extending link 128 reciprocably extends. The lower end of link 128 is provided with an enlargement 129 (FIG. 10) and a collar 130 is secured on said link above arm 70. A spring 131 (FIGS. 1, 10) reacts between enlargement 129 and arm 70 to yieldably hold the collar 130 against the upper side of said arm.

The upper end of link 128 is pivotally connected at 134 (FIG. 10) with a crank 135. Said crank is adjustably connected with one end of the rotary shaft 136 of a conventional counter 137. The counter body itself is supported at its opposite end on an upward projection 138 (FIG. 10) that is integral with the bridge piece 80 that, in turn, is integral with the block 55. Said counter may have any desired number of counter wheels 139 (FIG. 1), and upon each downward movement of the crank 135 a counter wheel will be actuated in the usual way for moving each successive member to a reading position, all in the manner that is usual with counters of this type. The crank 135 is adapted to be releasably clamped to the central actuating shaft 136, said crank being split to receive the end of the shaft (FIG. 10) between the portions of the crank at opposite sides of the split, and a bolt 140 tightens said portions against the crank to secure it to the shaft 136. The pivot 134 may be merely the end of the rod 128 but at a right angle to the downwardly extending portion of the latter to enter an opening in one side of crank 135 eccentrically of shaft 136.

The cover that encloses most of the working parts of the device is generally designated 142 (FIG. 1), having a dome shaped upper end 143. A cylindrical skirt integral with the dome 143 fits at its lower marginal portion over the upper cylindrical marginal portion 37 of the upper body 35, which upper body encloses the lower body 16 and is releasably locked to the latter. As approximately a final step in the assembly of the device, the skirt portion of the cover 142 is inseparably cemented to said portion 37, so that unauthorized access to the elements of the dispenser within said cover is impossible, without breaking or obviously mutilating the cover.

Said cover includes a generally rectangular recess 145 (FIG. 3). This recess has opposed sidewalls 146, a rear wall 147 and a bottom wall 148. The upper end of the head 117 is thickened as at 149 (FIG. 6) to slidably extend over the upper edges of the sidewalls 146. Rear wall 147 is formed with an opening through which the push rod 116 slidably extends.

Head 117 is relatively thick, and its edges preferably slidably fit within the walls of recess 145. Also head 117 is formed with an opening in which the outer end of the push rod 117 fits, and is cemented, after the cover is in position on the body 35.

By the above structure it is impossible to insert an implement between the head 117 and the walls of the recess 145 at any time, either when the head 117 is in its outermost position, or at any time during movement of the head into recess 145, and also, the wall 147 may function as a limit stop for inward movement of the push rod, which would therefore also constitute a stop for movement of the T-slide 55.

The cover 142 is also formed with an opening 150 through which the walls of passageway 52 project (FIG. 2), and alongside said opening is an opening 153 through which the upper end of tube 122 projects. A closure plate 154 (FIGS. 1, 2 is hingedly connected with an upstanding lug 155 (FIG. 1) that is integral with cover 142 and which lug is at the upper edge of plate 154 for automatic swinging to an open position under the influence of gravity when the device is tilted to pouring position (FIG. 8), and which closure plate will automatically close the upper ends of passageways 52, 122 when the container is restored to inoperative upright position (FIG. 1).

Inasmuch as it is not desirable that push rod 116 be actuatable when the container or bottle is upright, an automatically actuatable lock is provided in the form of a right angle lock member generally designated 157 (FIG. 9). This member is pivotally supported by a horizontal pivot 158 between the vertical wall 114 (FIGS. 2, 10) and the side of the T-slide 82 that is opposite to the push rod 116.

One arm 159 of the lock member (FIG. 9) is heavier than the other arm, and will automatically swing downwardly to generally vertical position when the bottle on which the dispenser is secured is upright. Pivot 158 is offset to one side of the passageway in which the leg 83 of the T-slide is positioned, and when the arm 159 swings downwardly, it will cause the other arm 160 to swing across the path of movement of the aforesaid leg 83 (FIG. 9) thus preventing the T-slide 82 from being moved by the push rod 116. However, upon the bottle being tilted to pouring position the gravity actuated arm 158 will automatically swing counterclockwise as seen in FIG. 9 to move the other arm 160 to a vertically downwardly extending position out of slide-obstructing position.

It is desirable that access be had to the upper surface of the lower body portion 16 so as to have access to the sleeve expanding nut 24 in order to change the device from one bottle to another. The lock 18 provides such means.

Lock 18 is conventional in that it is a cylinder lock having the usual tumblers thereon actuated by a key thrust axially into the opening 163 thereof (FIG. 11). The inner end of the rotatable portion of the lock has a cam 164 thereon, which cam has an enlarged lobe 165 at one side and a lobe 166 at the opposite side providing a reentrant angle where they join. Lock 18 is positioned eccentrically relative to the central axis of the body 16, and a pair of similar locking rods 167 extend angularly outwardly from the cam 164 to opposite sides of the body 16. Passageways 168 are formed in body 16 for said rods. Said rods are reciprocable in said passageways. The inner ends of the passageways guide the inner ends of the rods 167 to engagement with the juncture between lobes 165, 166 at opposite sides of lobe 166, and a collar 169 rigid on the inner end of each rod is slidably supported in each passageway 168. A bearing 170 is secured within each passageway adjacent to the outer end thereof for slidably supporting the outer end of each rod.

Before positioning the rods in the passageways, an expansion coil spring 171 is positioned on each rod between collar 169 and bearing 170 to react between each bearing 170 and collar 169 for yieldably urging the inner ends of the rods into the reentrant recesses in the sides of the cam 164. The key for the lock can only be withdrawn from the lock when the cam has been rotated to move the rods axially outwardly to locking position, and in order to permit the rods to so move, and to lock the upper body 35 and cover to the lower body 16, the skirt of the upper body is formed with openings 174 (FIG. 8) into which the outer ends of the locking rods will project when the rods are moved to said locking position.

Outwardly projecting pins 175 (FIG. 8) formed on the outer circular periphery of the body 16, adjacent to openings 170, are adapted to enter downwardly opening guide slots 176 formed in the skirt 36 of the upper body 35 to properly position the openings 170 relative to rods 167, and to also position the passageway 119 in which valve member 33 is positioned, coaxial with recess 31 which is of importance since these parts are concealed when the upper body 35 is secured to the lower body 16.

In operation the sleeve 5 is first drawn onto tube 7 and flange 6 is positioned in the enlargement 19 of the passageway through body 16. The sleeve and tube are then inserted into the neck of the bottle and the expanding nut 25 is then threadedly engaged with the threads on the upper end of tube 7. Upon tightening the nut with a spanner wrench the sleeve 5 tightly locks the body 16 to the bottle against withdrawal therefrom.

The upper assembly, including the cover, is then securely locked over and to body 16 by locking rods 167, and, unless the locking rods are in locking position, the key cannot be removed and, when the rods are in locking relation to the upper body, they cannot be moved or pushed back except by actuation of the proper key.

The device would now be ready for a pouring operation, the valve member 44 being open into the measuring chamber 34 and valve member 50 being closed.

Upon tilting the bottle to pouring position of FIG. 8 the air in the measuring chamber will bubble through the liquid in the bottle until the measuring chamber is filled, none of this liquid passing into passageway 119 due to valve member 118.

Upon pushing the head 117 on the push rod 116 inwardly the first part of the movement will be transmitted through link 103 to close the valve 44 since the cross arm 99 on the link 97 will merely slide in recesses 95 until it engages the side of recess 93 that extends across the open end of recess 92. The closing of the valve member 44 is under the tension of spring 75 hence further movement of the push rod 116 will cause valve member 50 to open and atmospheric air will then be admitted to the measuring chamber to permit free flow of the liquid therefrom through the passageway 52, the closure 154 having automatically swung to open position, and valve member 33 at that time will be in the upper end portion 127 of the duct 29 leading to the inside of the bottle. The crank 135 will be actuated only upon the final movement resulting in the opening of valve 50.

Upon release of pressure against the head 117 of the push rod 116 the head, push rod and slide member 82 will be restored to the position shown in FIG. 1. The valve member 50 will first be closed and valve member 44 will then be opened during the return of push rod 116 and slide member 82. Also the counter 139 will have been actuated to advance a number, which can be clearly seen through the window opening 180 in the upper end of housing, which window may be of transparent material cemented or otherwise securely fastened against removal.

It is pertinent to note that the working mechanism above partition 38, and in the upper portion of the housing that includes the cover, lower portion and body 16, is enclosed from the measuring chamber. If the capacity of the latter is to be changed, any suitable rings or segments may be positioned within the measuring chamber to displace liquid and to thereby change the volume.

Preferably most of the dispenser is cast from plastic material that is resistant to any possible undesirable effects from the liquids that are dispensed.

In a relatively broad aspect the dispenser as disclosed in the drawings may be considered as being an open-ended conduit (tube 7, chamber 34 and passageway 52) opening at one end into the bottle or container and at its opposite end opening outwardly through a pouring spout, which conduit is enlarged at a point intermediate its ends to provide a measuring chamber 34 adapted to hold the desired measured amount of liquid to be dispensed. The conduit includes a first and a second valve movable thereon, with means connected therewith for substantially simultaneously moving the first valve from a normally open position for admitting passage of liquid through the conduit into the measuring chamber and for moving said second valve from a normally closed position to an open position for permitting passage of the liquid from said measuring chamber to said pouring spout for discharge from the latter when the container and dispenser are tilted from an upright nonoperating position to a tilted pouring position, and when the measuring chamber is filled.

After a discharge of liquid from the measuring chamber and after the valve actuating means is released and the bottle or container is restored to upright position, the first valve will close and the second one will open so that the measuring chamber may be filled when the container is again tilted.

An air conduit is in communication with the enlarged portion of the conduit and with the container for liquid to control the admission of air to the conduit at points that are critical to the desired flow of this liquid in a dispensing operation.

I claim:
1. In a dispenser for dispensing a predetermined measured amount of liquid from a container having said liquid therein and having a neck for pouring liquid from said container;
   (a) a housing having an upper end and a lower end and an open-ended conduit having one open end thereof at said lower end of said housing providing an inlet to open into said container and the other open end at said upper end of said housing opening outwardly thereof providing a discharge outlet, when the lower end of said housing is secured on the neck of said container;
   (b) said conduit having an enlarged portion intermediate its ends defining a measuring chamber;
   (c) a first valve means within said conduit normally closing the latter to flow of liquid from said measuring chamber to said discharge outlet;
   (d) a second valve means within said conduit in a normally open position for flow of liquid from said inlet into said measuring chamber when said housing is on said neck and said housing and container are inverted to pouring position;
   (e) valve actuating means connected with said first and said second valve means and manually actuatable for movement to move said second valve means to closed position closing said conduit to flow of liquid into said measuring chamber from said inlet and for moving said first valve means to open position opening said conduit to flow of liquid in said measuring chamber to said discharge outlet, in succession, when said housing and container are in said pouring position;
   (f) an air duct separate from said conduit communicating between said measuring chamber and the atmosphere for admitting air into said measuring chamber;
   (g) a passageway separate from said conduit for air communicating between said measuring chamber and the interior of said container when said housing is on said neck;
   (h) a member connected with said valve actuating means actuatable for movement from a position closing said air duct to flow of atmospheric air into said measuring chamber when said first valve means is in closed position, and opening said passageway to flow of air between said measuring chamber and said container, to a position closing said passageway to flow of air between said measuring chamber and opening said air duct to flow of atmospheric air into said measuring chamber upon actuation of said valve actuating means to move said first valve means to open position and said second valve means to closed position, and vice versa.
2. In a dispenser as defined in claim 1,
   (i) a partition within said housing, dividing the latter into an upper portion and a lower portion, and defining the upper wall of said measuring chamber when said housing is in an inoperative position for pouring;
   (j) said first and said second valve means being within said measuring chamber and said valve actuating means being within said upper portion and wholly out of liquid adapted to fill said measuring chamber.
3. In a dispenser as defined in claim 1,
   (i) said conduit including a portion thereof adapted to extend into the neck of said container in sealing relation with the inside of said neck, and
   (j) means within said housing actuatable for expanding said last-mentioned portion to securing and sealing relation to said neck, and for releasing said part for removal of the latter from said neck;
   (k) said housing being separable into an upper and a lower part providing access to said last-mentioned means when said upper part is removed, and
   (l) key locking means for locking said parts together against separation to prevent unauthorized access to said last-mentioned means.

References Cited
UNITED STATES PATENTS

| | | | |
|---|---|---|---|
| 2,504,145 | 4/1950 | Morrone | 222—38 |
| 2,566,669 | 9/1951 | Lesnick | 222—38 X |
| 2,883,086 | 4/1959 | Davison et al. | 222—38 X |
| 3,235,133 | 2/1966 | Zimmerman et al. | 222—189 |

SAMUEL F. COLEMAN, *Primary Examiner.*